May 21, 1963 J. K. OXENHAM 3,090,888

CATHODE RAY TUBE VIEWING SCREEN FOR COLOUR TELEVISION

Filed April 11, 1960 2 Sheets-Sheet 1

INVENTOR
JOHN KENNETH OXENHAM

BY
Theodore [signature]
ATTORNEY

CATHODE RAY TUBE VIEWING SCREEN FOR COLOUR TELEVISION

Filed April 11, 1960 2 Sheets-Sheet 2

INVENTOR
JOHN KENNETH OXENHAM
BY
Theodore Jay Jr.
ATTORNEY 3,090,888
Patented May 21, 1963

3,090,888

CATHODE RAY TUBE VIEWING SCREEN FOR COLOUR TELEVISION

John Kenneth Oxenham, London, England, assignor to Sylvania-Thorn Colour Television Laboratories Limited, London, England, a British company Filed Apr. 11, 1960, Ser. No. 21,517
4 Claims. (Cl. 315—12)

The present invention relates to colour television and is concerned with receiving apparatus of the type employing a cathode ray tube having a viewing screen comprising recurrent groups of parallel or substantially parallel stripes, each group containing a plurality of colour stripes adapted to emit or transmit light of suitable different colours when bombarded by the cathode ray beam and indexing stripes being provided having a secondary electron emission, under bombardment by the cathode ray beam, which differs from that of the remainder of the screen and serves to generate indexing signals. Usually stripes emitting light of three colours, namely red, green and blue, are provided and each group is known as a colour triplet.

In the operation of such apparatus, the cathode ray beam is scanned over the stripes in a direction at least approximately perpendicular to their length and signals representative of the intensities of colours in the picture to be reproduced may be gated and applied to control the beam intensity. It is necessary that the gating should be such that the signals representing each colour should be gated to control the beam intensity at the instants when the beam is directed upon stripes of the corresponding colours, and for this purpose the gating is carried out under the control of the indexing signals.

In another form of apparatus such as is described in "A New Beam-indexing Color Television Display System" by R. G. Clapp and others published in Proceedings of the Institute of Radio Engineers, volume 44, No. 9, September 1956, page 1108, there is no gating of the signals but nevertheless indexing signals are used to ensure the maintenance of the proper relationship between the signals and the instantaneous positions of the beam.

In some forms of screen one index stripe is associated with each colour triplet and in other screens, such as set forth in the specification of patent application of R. Graham, Serial No. 765,757 filed October 7, 1958 (now U.S. Patent No. 2,945,087) this is not the case. The present invention is applicable irrespective of which of the aforesaid forms of screen is used.

The construction of viewing screens for apparatus of the type referred to has presented difficulties. One such difficulty is to obtain a sufficient difference between the secondary emission from the indexing stripes and that from the colour stripes. Another is to construct tubes in which the said difference is sufficiently uniform over the screen and in which there is not excessive variation from tube to tube.

In the specification of patent application Serial No. 754,583 of John Kenneth Oxenham filed August 12, 1958 (now U.S. Patent No. 3,018,405) there is described and claimed a method of making a viewing screen for apparatus of the type specified comprising the steps of applying to a transparent base, which may be the end wall of the cathode ray tube, groups of colour stripes of insulating material, spaces being provided between certain of the colour stripes, applying a coating of electrically conducting material over the stripes and spaces, the nature of the coating material and the mode of its application and the nature of the insulating material being such that the spaces are provided with coatings of good electrical conductivity while the coatings over the groups of stripes are discontinuous, and the coatings in the spaces being electrically connected together, and applying over the coating of conducting material a layer of a material having high secondary electron emissivity. The conducting coating may be aluminium and the material of high secondary electron emissivity may be magnesium oxide.

In operation, the number of secondary electrons emitted when the cathode ray beam strikes the magnesium oxide will depend upon the potential of the conducting layer on the screen in relation to that of the secondary electron collector, being greater the more negative the conducting layer of the screen is in relation to the collector. Thus, assuming that the secondary electron collector is maintained at a potential suitably positive relatively to the initial potential of the screen, when the cathode ray beam strikes the magnesium oxide lying over the discontinuous coating, it quickly stabilises at some potential below that of the secondary electron collector owing to the insulating nature of the discontinuous coating. When the potential is stabilised the number of secondary electrons will equal the number of primary electrons (that is the secondary emission ratio is unity), so that no net current flows through a resistor connected in series with a suitable bias source between the coating of conducting material and the final anode of the cathode ray tube. However, when the beam strikes the magnesium oxide layer resting upon the conducting coating, such rapid stabilisation does not occur since current can flow to replace the electrons leaving the screen and thus prevent a rise in potential of the screen. In consequence substantial secondary emission takes place and a substantial net current, being the difference between the secondary and primary currents, flows through the resistor to the screen, causing a signal to appear across the resistor.

One disadvantage of the screen made as described in specification No. 754,583 is that the aluminium which coats the phosphor particles and the glass surface upon which they are supported decreases the light output from the phosphor several times, since at least part of the light which is viewed has to pass through the aluminium coating.

The present invention has for its principal object to provide a viewing screen for colour television receiving apparatus of the type set forth, and a method of making such a screen, in which the disadvantage set forth is substantially reduced or avoided.

According to the present invention there is provided a viewing screen for colour television receiving apparatus of the type set forth wherein the said stripes are provided with a coating of an electrically conducting material which is provided with a layer of high secondary electron emissivity, the said coating being discontinuous over the indexing stripes and continuous over the remainder of the screen.

The effect of this is the reverse of that produced with the screen described in specification No. 754,583 namely that the indexing signal is derived from a decrease in secondary electron emission instead of from an increase in such emission.

In some cases certain stripes may function both as indexing stripes and as colour stripes. For instance, certain of the blue stripes may be arranged to function as colour and indexing stripes, the electrically conducting material being discontinuous over these stripes, and the remainder of the blue stripes may function only as colour stripes, the conducting material being continuous of these stripes.

According to a modification of the invention, for a reason that will appear hereinafter, the continuous coating of conducting material is divided into two mutually insulated interlaced parts.

The present invention also provides a method of making a viewing screen for apparatus of the type specified comprising the steps of applying colour phosphor stripes to a transparent base, coating the said stripes and the surfaces of the transparent base not covered by such stripes with a plastics material, applying indexing stripes over the said coating in desired positions, applying a coating of an electrically conducting material over the whole exposed surface, the nature of the conducting material, the mode of its application, and the nature of the indexing stripes being such that the conducting material forms a discontinuous coating upon the index stripes and a continuous coating elsewhere, and applying over the coating of conducting material a layer of a material having high secondary electron emissivity.

The invention will be described, by way of example, with reference to the accompanying drawings in which—

Figure 7:
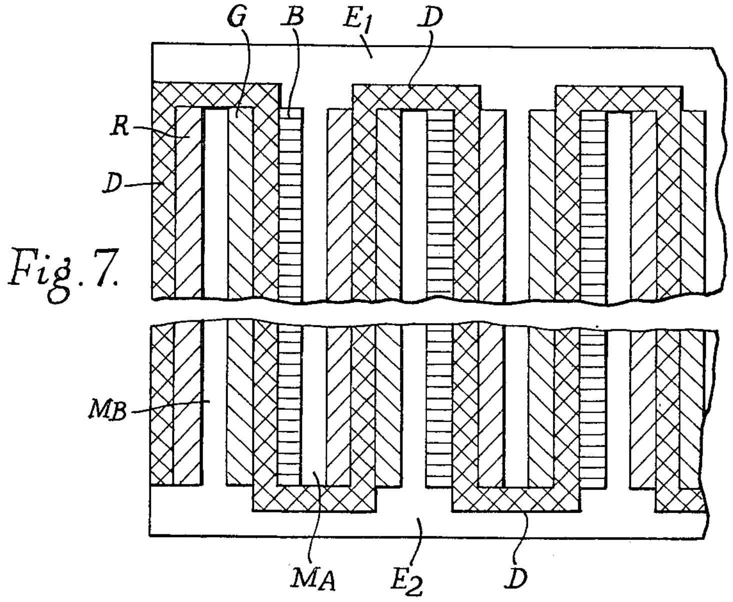
FIG. 7 is a much enlarged view in elevation of a part of another screen according to the invention and FIG. 8 is a diagram showing part of a cathode ray tube embodying a screen according to the invention with its circuit connections.

In the various sections like materials are represented by like cross-hatching. In FIG. 7 the materials are indicated by the same cross-hatchings as are used in the sections even though they are not in section.

Figure 1:
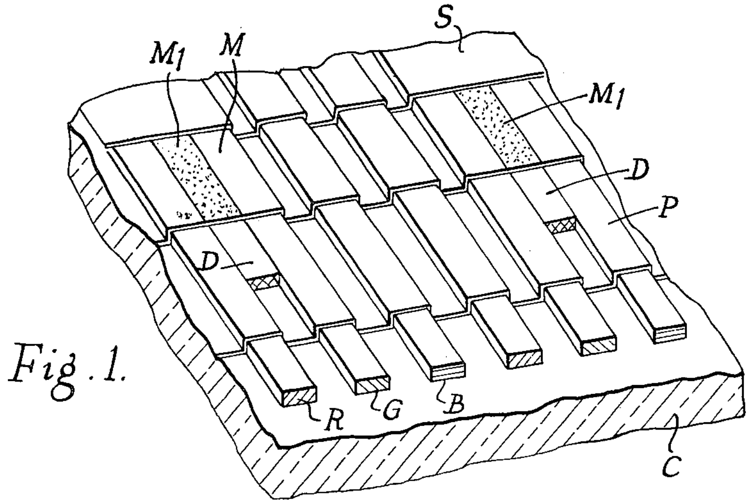
FIG. 1 is a much enlarged, somewhat diagrammatic, perspective view of a part of one viewing screen according to the invention with layers broken away to show the construction.
Figures 2, 3:
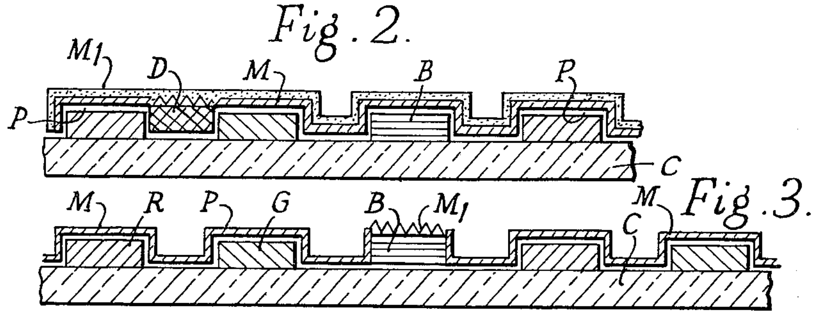
FIG. 2 is a view in cross-section of part of the screen in FIG. 1.
FIGS. 3 to 6 are views in cross-section of other screens according to the invention, the layer of high secondary electron emission being omitted.
Figure 4:
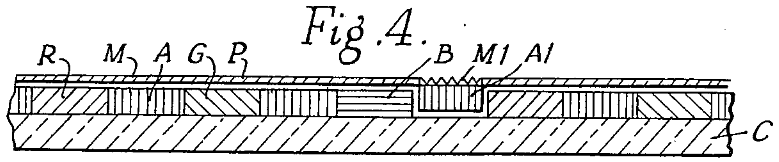

Referring to FIGS. 1 and 2, colour phosphor stripes R, G, and B, representing red, green and blue phosphors respectively, are formed upon one surface of a glass base C, which may be the end wall of a cathode ray tube. These stripes may be deposited by well-known photo-resist techniques. Over the stripes R, G, B and over the spaces between these stripes is applied a layer P of a plastics material, such as nitro-cellulose. Stripes D of an inactivated phosphor (which does not therefore emit light when bombarded by the cathode ray beam) are formed in certain of the spaces between colour stripes to constitute indexing stripes. The surface is then aluminised and baked to bake away the plastics layer, thus forming a coating M of aluminium which is discontinuous, and hence non-conducting at $M_1$ over the relatively rough surface of the phosphor D but continuous, and thus conducting, where the aluminium was deposited on the plastics layer P. Finally there is applied a layer S of high secondary electron emission, such as magnesium oxide.

Apart from improving the light emission for reasons already given, the screen described has the advantage over the construction according to specification No. 754,583 that the index stripes can be more accurately disposed and thus give greater accuracy in indexing. This may be explained as follows. Assume that in the earlier arrangement the colour stripes are in the order red, green, blue, and all have a width of 0.005" and a nominal spacing of 0.005". Assuming further, a system in which the indexing stripes are so spaced as to yield an index signal which has a frequency three quarters of the frequency of scanning the colour triplets, if the spacing between red and green be correct, namely 0.005", that between green and blue 0.004", and that between blue and red 0.006", then the index stripes have widths 0.005", 0.004", and 0.006". This leads to errors in the system owing to the non-uniformity of the indexing signals generated. On the other hand errors such as have been assumed are quite tolerable as far as colour rendition is concerned.

With the present invention, on the other hand, the index stripes can be deposited upon the smooth nitro-cellulose surface and their accuracy will be largely dependent upon the accuracy of the photographic negative used, which can be made high.

Figure 8:
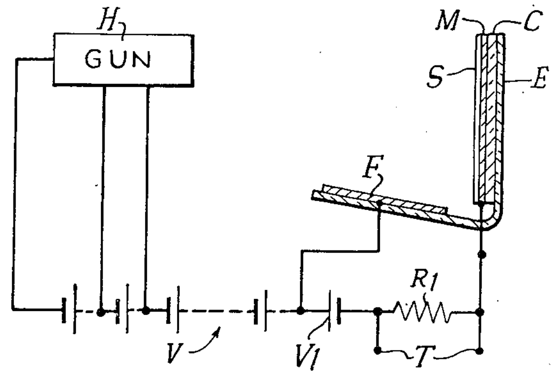

In use, as shown in FIG. 8, the cathode ray tube embodying the screen described may have a deposit of a conducting material F around the inside of the envelope E near the screen C, M, S, to act as a secondary electron collector. The continuous conducting coating M of the screen is connected through a resistor $R_1$ and a bias source $V_1$ to the collector F, the bias source holding the said coating M slightly negative relatively to the collector F. The electrodes of the electron gun H of the tube are connected to suitable tappings on the source V.

When the beam scans those parts of the screen over which the continuous conducting coating M extends, the secondary emissive current in the resistor $R_1$ is high. When the beam strikes the magnesium oxide S lying above an index stripe D owing to the substantially non-conducting nature of the layer $M_1$ the region struck quickly rises in potential by loss of a few secondary electrons and thereafter the secondary emission ceases. The current in the resistor $R_1$ is, therefore, small.

The voltage impulses generated across the resistor $R_1$ by the scanning of the indexing stripes are taken at terminals T to constitute the indexing signal.

It is not necessary that the indexing stripes should be of inert phosphor. They may be constituted by selected colour stripes or by guard bands such as are described in the specification of application Serial No. 765,757. In some cases indexing stripes of all the three kinds referred to may be used. Certain further arrangements of stripes will be described with reference to FIGS. 3 to 7.

In FIG. 3 one index stripe is provided for each colour triplet and is constituted by the blue phosphor stripes. Thus the red and green stripes R and G are first applied to the base C, then the nitro-cellulose coating P and the blue stripes B are applied over the coating P. The remainder of the process is as already described. There will be some loss of light from the blue stripes owing to the interposition of the layer P but blue phosphors tend to have high efficiency and would otherwise have to be diluted to match the efficiencies of the red and green phosphors.

Figure 5:
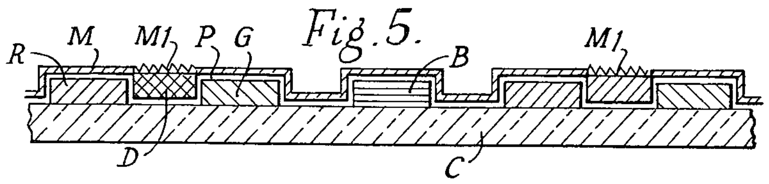

In FIGS. 4 and 5 there is again one index stripe for each colour triplet but in FIG. 4 the index stripe is constituted by one of the guard bands A, namely $A_1$, that are interposed between colour stripes. In FIG. 5 the index stripe is constituted by inert phosphor D between the red and green phosphor stripes R and G.

Figure 6:
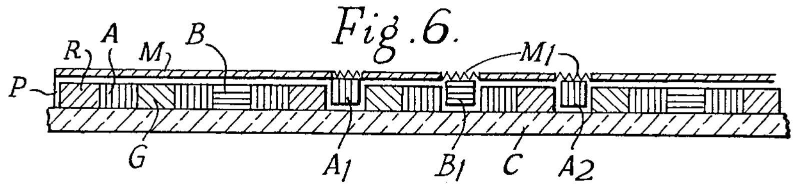

FIG. 6 shows the application of the present invention to one of the forms of indexing in which cross-modulation is reduced and phase ambiguity is avoided. In every three colour triplets all the red and green phosphor stripes R and G together with two blue phosphor stripes B and seven of the guard bands A are applied beneath the layer P, while the remaining blue phosphor stripe $B_1$ and two guard bands $A_1$ and $A_2$ are applied above the layer P to act as indexing stripes.

FIG. 7 shows how the present invention can be applied to one of the forms of screen described in specification No. 754,583 which is designed to reduce the delay that occurs between the beam impinging upon and ceasing to impinge upon the magnesium oxide, where it lies over the continuous conducting coating, and the rise and fall in current in the resistor $R_1$ of FIG. 8. This delay is due to the transit time of the electrons passing from the screen to the collector F and varies over the screen surface because of the different distances of points in the screen surface from the collector F.

In the arrangement of FIG. 7, the phosphor stripes R, G and B are applied to the base as before below the nitro-cellulose layer, and above the nitro-cellulose layer is applied inert phosphor D formed in a zig-zag. The aluminium layer is then applied over the whole surface and will be conducting excepting over the zig-zag where it is substantially insulating. A conducting area $E_1$ is thus connected with conducting fingers, such as MA, and a conducting area $E_2$ is connected with conducting fingers such as MB which are interleaved with the fingers MA. The whole surface is coated with magnesium oxide, although this is not shown.

In use, one area, say $E_1$, is connected to the collector F in FIG. 8 while the other area $E_2$ is connected through the resistor $R_1$ as shown in FIG. 8. The fingers MA which are at the higher potential therefore act as secondary electron collectors for electrons emitted from the region of the fingers MB. Of course it will be appreciated that the conducting fingers extend over the adjacent colour phosphor stripes.

The indexing signal generated with this arrangement will have half the frequency corresponding to the spacing of the indexing stripes.

In the example of FIG. 7 the index stripes are arranged as described in the specification of patent application Serial No. 765,757, to give an indexing signal whose frequency is not equal to the recurrence frequency of the scanning of the colour triplets and is known as non-integral; that is the frequency of scanning the colour triplets is not an integral multiple of the indexing signal frequency.

I claim:

1. A viewing screen for colour television comprising a transparent base, a series of groups of colour stripes on said base, each said group comprising a plurality of parallel stripes emitting different colours, each colour stripe consisting of an activated cathodoluminescent phosphor, a plurality of indexing stripes on said base parallel to said colour stripes, each indexing stripe consisting of an inactivated cathodoluminescent phosphor, an electrically discontinuous coating of electrically conducting material over said indexing stripes, an electrically continuous coating of said conducting material over the remainder of said screen and a layer of high secondary electron emissivity over said coatings of conducting material.

2. A viewing screen according to claim 1, wherein said continuous coating comprises two mutually insulated parts having fingers interlaced with one another.

3. A colour television receiver including a cathode ray tube, said cathode ray tube having a viewing screen, and means for scanning the cathode ray beam of said tube over said screen, said viewing screen comprising a transparent base, a series of groups of colour stripes on said base, each said group comprising a plurality of parallel stripes emitting different colours, each colour stripe consisting of an activated cathodoluminescent phosphor, a plurality of indexing stripes on said base parallel to said colour stripes, each indexing stripe consisting of an inactivated cathodoluminescent phosphor, an electrically discontinuous coating of electrically conducting material over said indexing stripes, an electrically continuous coating of said conducting material over the remainder of said screen and a layer of high secondary electron emissivity over said coatings of conducting material, and said receiver further comprising a secondary electron collector, means for maintaining said continuous coating negative relatively to said collector and an impedance connected between said continuous coating and said collector.

4. A colour television receiver including a cathode ray tube, said cathode ray tube having a viewing screen, and means for scanning the cathode ray beam of said tube over said screen, said viewing screen comprising a transparent base, a series of groups of colour stripes on said base, each said group comprising a plurality of parallel stripes emitting different colours, each colour stripe consisting of an activated cathodoluminescent phosphor, a plurality of indexing stripes on said base parallel to said colour stripes, each indexing stripe consisting of an inactivated cathodoluminescent phosphor, an electrically discontinuous coating of electrically conducting material over said indexing stripes, an electrically continuous coating of said conducting material over the remainder of said screen, said continuous coating comprising two mutually insulated parts having fingers interlaced with one another, and a layer of high secondary electron emissivity over said coatings of conducting material, and said receiver further comprising a secondary electron collector, means for maintaining a potential difference between said parts and an impedance connected between said parts.

References Cited in the file of this patent

UNITED STATES PATENTS

| | | |
|---|---|---|
| 2,705,764 | Nicoll | Apr. 5, 1955 |
| 2,736,764 | Bingley | Feb. 28, 1956 |
| 2,768,318 | Bradley et al. | Oct. 23, 1956 |
| 2,945,087 | Graham et al. | July 12, 1960 |